US008456279B2

(12) United States Patent
Milne et al.

(10) Patent No.: US 8,456,279 B2
(45) Date of Patent: Jun. 4, 2013

(54) ACCELEROMETER-BASED CE DEVICE WIRELESS ACCESS POINT MAPPING

(75) Inventors: James R. Milne, Ramona, CA (US); Kirstin Connors, San Diego, CA (US); Trisha Ann Sachie Yasuhara, San Diego, CA (US)

(73) Assignee: Sony Corporation, Tokyo (JP)

( * ) Notice: Subject to any disclaimer, the term of this patent is extended or adjusted under 35 U.S.C. 154(b) by 329 days.

(21) Appl. No.: 12/705,173

(22) Filed: Feb. 12, 2010

(65) Prior Publication Data

US 2011/0109436 A1    May 12, 2011

Related U.S. Application Data

(60) Provisional application No. 61/258,731, filed on Nov. 6, 2009.

(51) Int. Cl.
| | | |
|---|---|---|
| G08B 5/22 | (2006.01) | |
| G08B 5/00 | (2006.01) | |
| G06F 3/041 | (2006.01) | |
| G09G 5/08 | (2006.01) | |
| G09G 5/00 | (2006.01) | |
| H04W 24/00 | (2009.01) | |
| H04B 7/00 | (2006.01) | |
| H03M 11/00 | (2006.01) | |
| A63F 13/00 | (2006.01) | |

(52) U.S. Cl.
USPC ........ 340/8.1; 340/691.6; 340/7.58; 345/173; 345/158; 345/676; 455/456.3; 455/515; 341/22; 463/39

(58) Field of Classification Search
USPC .............. 340/975, 976, 977, 978, 979, 407.1, 340/407.2, 572.1, 572.4, 572.5, 988, 10.1, 340/10.2, 10.3, 10.31, 10.4, 10.41, 10.42, 340/825.69, 825.71, 825.73, 825.31, 8.1; 345/156–179; 715/701, 702, 734–737, 853–854, 715/969; 382/189, 311, 187, 182, 229, 185, 382/188, 227, 315
See application file for complete search history.

(56) References Cited

U.S. PATENT DOCUMENTS

| | | | |
|---|---|---|---|
| 7,420,510 B2 | 9/2008 | Kolavennu et al. | |
| 7,450,110 B2* | 11/2008 | Shahoian et al. | ............. 345/173 |
| 2003/0161093 A1* | 8/2003 | Lam et al. | ..................... 361/681 |
| 2005/0059406 A1 | 3/2005 | Thomson et al. | |
| 2008/0057978 A1* | 3/2008 | Karaoguz et al. | .......... 455/456.3 |
| 2008/0182584 A1 | 7/2008 | Le | |
| 2008/0211778 A1 | 9/2008 | Ording et al. | |
| 2008/0254843 A1* | 10/2008 | Maenpaa | ................... 455/575.3 |
| 2008/0284620 A1* | 11/2008 | Olsson et al. | ................... 341/22 |
| 2008/0300055 A1* | 12/2008 | Lutnick et al. | .................. 463/39 |
| 2009/0085878 A1* | 4/2009 | Heubel et al. | ................. 345/173 |
| 2009/0174680 A1 | 7/2009 | Anzures et al. | |
| 2009/0227283 A1* | 9/2009 | Pylvanainen | .............. 455/556.1 |

OTHER PUBLICATIONS

James R. Milne, Kirstin Connors, Tisha Yasuhara, "Accelerometer-Based Tapping User Interface"co-pending U.S. Appl. No. 12/705,106, filed Feb. 12, 2010.

(Continued)

*Primary Examiner* — Jennifer Mehmood
*Assistant Examiner* — Mirza Alam
(74) *Attorney, Agent, or Firm* — John L. Rogitz

(57) ABSTRACT

A CE device for, e.g., displaying the time can incorporate an accelerometer to provide various features and enhancements. For example, using position derived from the accelerometer, the signal strength of a wireless access point (AP) can be mapped in a house.

17 Claims, 4 Drawing Sheets

OTHER PUBLICATIONS

James R. Milne, Kirstin Connors, Trisha Yasuhara, "Accelerometer-Based Touchscreen User Interface" co-pending U.S. Appl. No. 12/698,507, filed Feb. 2, 2010.

Hiroya Fujii, Isamu Arie, Ronald Clark, Justin Jakobson, Yuji Oikawa, Jow Wada, Rui Yamagami, Takuo Ikeda, Chia-Yao Lin, Junghee Yeo, "Digital Clock with Internet Connectivity and Multiple Resting Orientations" co-pending U.S. Appl. No. 12/820,458, filed Jun. 22, 2010.

Silver PAC, "Silver PAC Evolution 5500 Remote Would Have Been Great 3 Year Ago", Dec. 14, 2009; http://gizmodo.com/5426322/silver-pac-evolution-5500-remote-would-have-been-great-3-year-ago.

"The chumby one-a new faster, cheaper chumby", Nov. 16, 2009; http:///www.krunker.com/2009/11/16/the-chumby-one-a-new-faster-cheaper-chumby/.

Radionow, "Intergreated DAB, wi-fi, Twitter and Facebook? It makes Pure Sensia". Sep. 21, 2009; http://www.radio-now.com.uk/pure-sensia-wifi-radio.htm.

Kristofer Brozio, "Sungale ID800WT 8 Inch Wi-Fi Digital Touchscreen Photo Frame", Jun. 30, 2009; http://www.testfreaks.com/blog/reviews/sungale-id800wt-8-inch-wi-fi-digital-touchscreen-photo-frame/.

Axiss Technology Corporation, Taiwan, "WiFi Digital Photo Frame", http://tsyannawu.trustpass.alibaba.com/product/104940461-101256632/8_Inch-Digital_Photo_Frame.html.

A.R. Sandeep. Y. Shreyas, Shivam Seth, Rajat Agarwal, G. Sadashivappa; "Wireless Network Visualization and Indoor Empirical Propagation Model for a Campus Wi-Fi Network", http://www.waset.org/journals/waset/v42/v42-135.pdf, 2008.

Junfang Wang, Bin Xie, Kan Cai, Agrawal, D.P.; "Efficient Mesh Router Placement in Wireless Mesh Networks" http://ieeexplore.ieee.org/xpl/freeabs_all.jsp?arnumber=4428616, 2007.

S. Kouhbor, University of Ballarat; Julien Ugon, University of Ballarat; Alex Kruger, University of Ballarat; Alex Rubinov, University of Ballarat; "Optical Placement of Access Point in WLAN Based on a New Algorithm" http://www.computer.org/portal/web/csdl/doi/10.1109/CMB.2005.75, 2005.

Leslie A. Lenert, Douglas A. Plamer, Theodore C. Chan, Ramesh Rao; "An Intelligent 802.11 Triage for Medical Response to Disasters", http://www.ncbi.nlm.nih.gov/pmc/articles/PMC1560742/.

Paul Jin Hwang, Fredrik Carpio, Nikolaos Georgis, Benjamin Lo; co-pending application "GPS-Based CE Device Wireless Access Point Mapping".

* cited by examiner

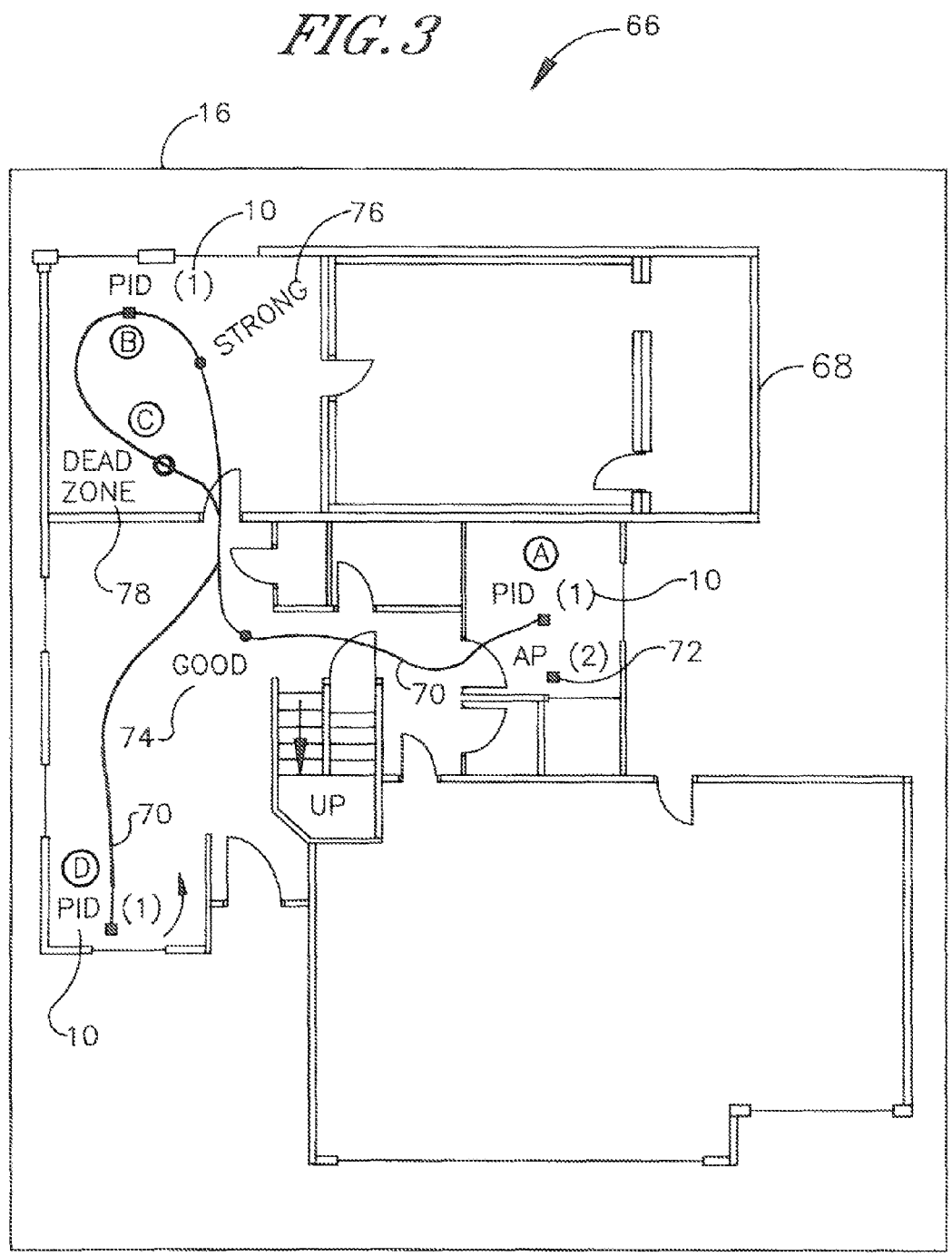

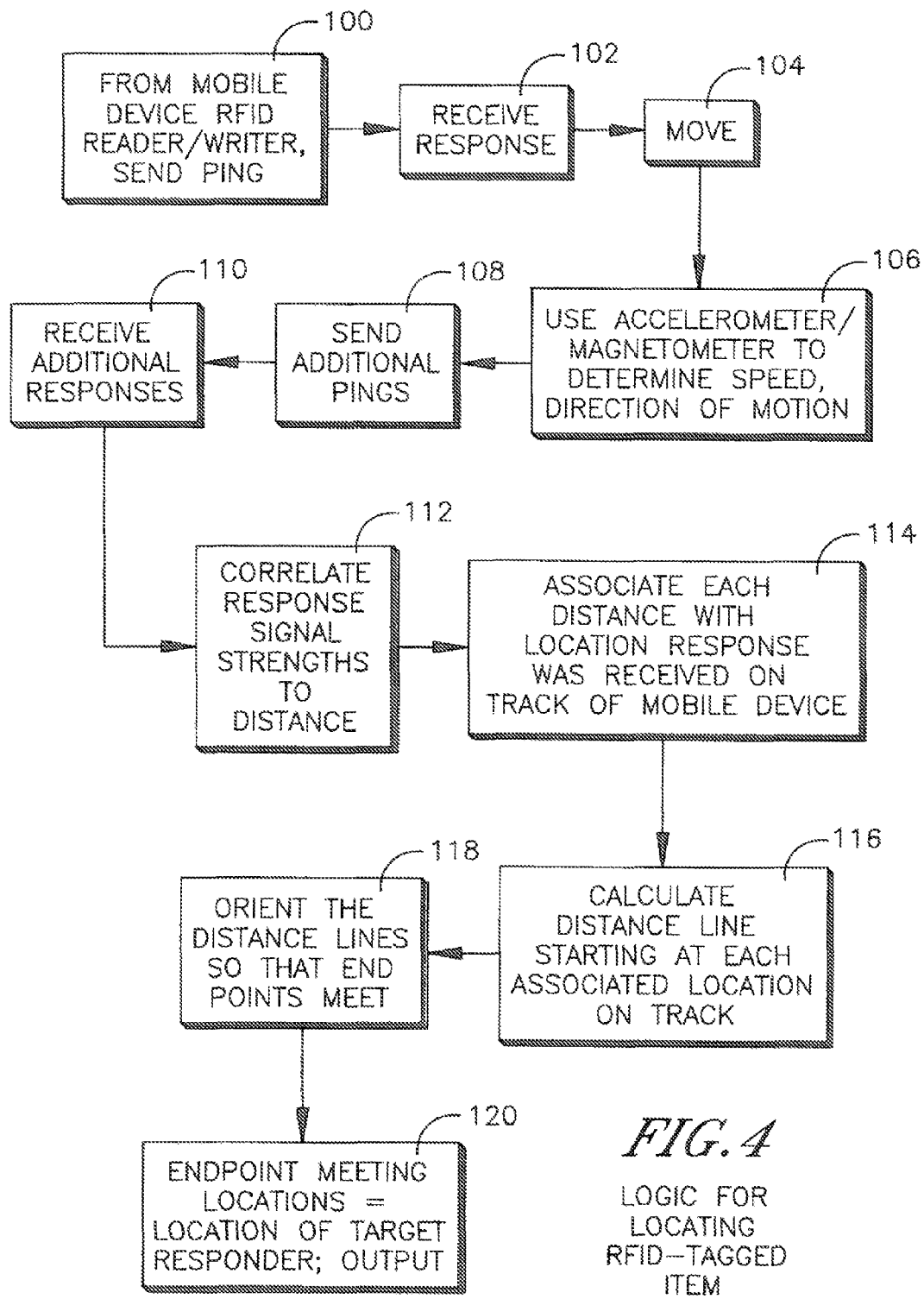

ACCELEROMETER-BASED CE DEVICE WIRELESS ACCESS POINT MAPPING

This application claims priority from U.S. provisional application 61/258,731, filed Nov. 6, 2009.

FIELD OF THE INVENTION

The present application is directed to using an accelerometer in a consumer electronics (CE) device to provide enhanced functionality of the CE device.

BACKGROUND OF THE INVENTION

A wide variety of CE devices such as wireless telephones, digital clocks, etc. have been provided that leverage digital processing to provide a multiplicity of useful features to users. The present application understands that such devices may be further enhanced by incorporating accelerometer principles.

As understood herein, compact technology known as microelectromechanical systems (MEMS) has been used to establish an accelerometer which, among other things, can measure acceleration above and below the gravitational constant. Essentially, an accelerometer may be provided that measures acceleration in all three spatial dimensions (e.g., along all three linear Cartesian axes), and the acceleration of an object such as a CE device in space may be correlated to the object's orientation, motion, and to detect taps on the object.

For instance, present principles understand that once an initial orientation is established, acceleration signals may be used to determine if an object is changing its orientation. As also recognized herein, a tap on an object can be sensed using an accelerometer because another object colliding with the accelerometer-bearing object causes a deceleration, e.g., a tap came from the +Z direction relative to the accelerometer makes an impact in the −Z direction. There are several variations to the above properties including tilt, shake, and free fall, but essentially these variations fit into one or more of the three main properties.

SUMMARY OF THE INVENTION

A consumer electronics (CE) device includes a housing bearing a processor and a visual display. The processor controls the display. An accelerometer is in the housing and outputs signals to the processor representing acceleration of the housing. The processor uses the signals from the accelerometer to generate a map of wireless access point (AP) communication conditions relative to an origin location in a building.

In some implementations the processor causes the map to be presented on the visual display. The map correlates locations in the building with respective AP communication conditions. The positions can include linear position relative to the origin and orientation.

In non-limiting embodiments a magnetometer and/or gyroscope can communicate with the processor. The processor uses signals from the magnetometer and/or gyroscope to generate the map.

Also, in example embodiments the processor may indicate on the map locations of radiofrequency identification (RFID) tag-equipped components in the building. If desired, the processor can determine that current AP signal strength (SS) is less than a recorded SS for a current location, and in response can present a message on the CE device to move the CE device to a new location.

In another aspect, a consumer electronics (CE) device includes a housing bearing a processor and a visual display, with the processor controlling the display. An accelerometer is in the housing. The processor receives signals from the accelerometer that represent acceleration of the housing. The processor uses the signals from the accelerometer to generate a map of locations of radiofrequency identification (REID) tag-equipped components in a building.

In another aspect, a method includes receiving, in a CE device, position derived from an accelerometer, and receiving signals from a wireless access point (AP). The method correlates at least first and second positions to first and second AP signal strengths (AP).

In another aspect, a consumer electronic (CE) device has a housing bearing a processor and a motion sensor in the housing and outputting signals to the processor. A radiofrequency identification (RFID) communication device is in the housing in communication with the processor. The processor causes the RFID communication device to transmit at least first and second pulses to a target. The RFID communication device receives back first and second responses from the target in response to the respective first and second pulses. Each response has a signal strength and the first and second pulses and/or first and second responses are associated with respective first and second times. The signals strengths are correlated to respective first and second distances and the first and second times are correlated to respective first and second locations of the CE device. The processor determines a location of the target based on the first and second distances and first and second locations.

In another aspect, a consumer electronics (CE) device has a housing bearing a processor and a motion sensor in the housing and outputting signals to the processor. A radiofrequency identification (RFID) communication device is in the housing in communication with the processor. The RFID communication device receives first and second RFID signals from the target. Each RFID signal has a signal strength and the first and second signals are associated with respective first and second times. The signals strengths are correlated to respective first and second distances and the first and second times are correlated to respective first and second locations of the CE device. The processor determines a location of the target based on the first and second distances and first and second locations.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a schematic plan view illustrating the mapping of AP signal strengths; and FIG. 4 is a flow chart of logic for locating an RFID-tagged target device.

DETAILED DESCRIPTION OF THE PREFERRED EMBODIMENT

Figure 1:
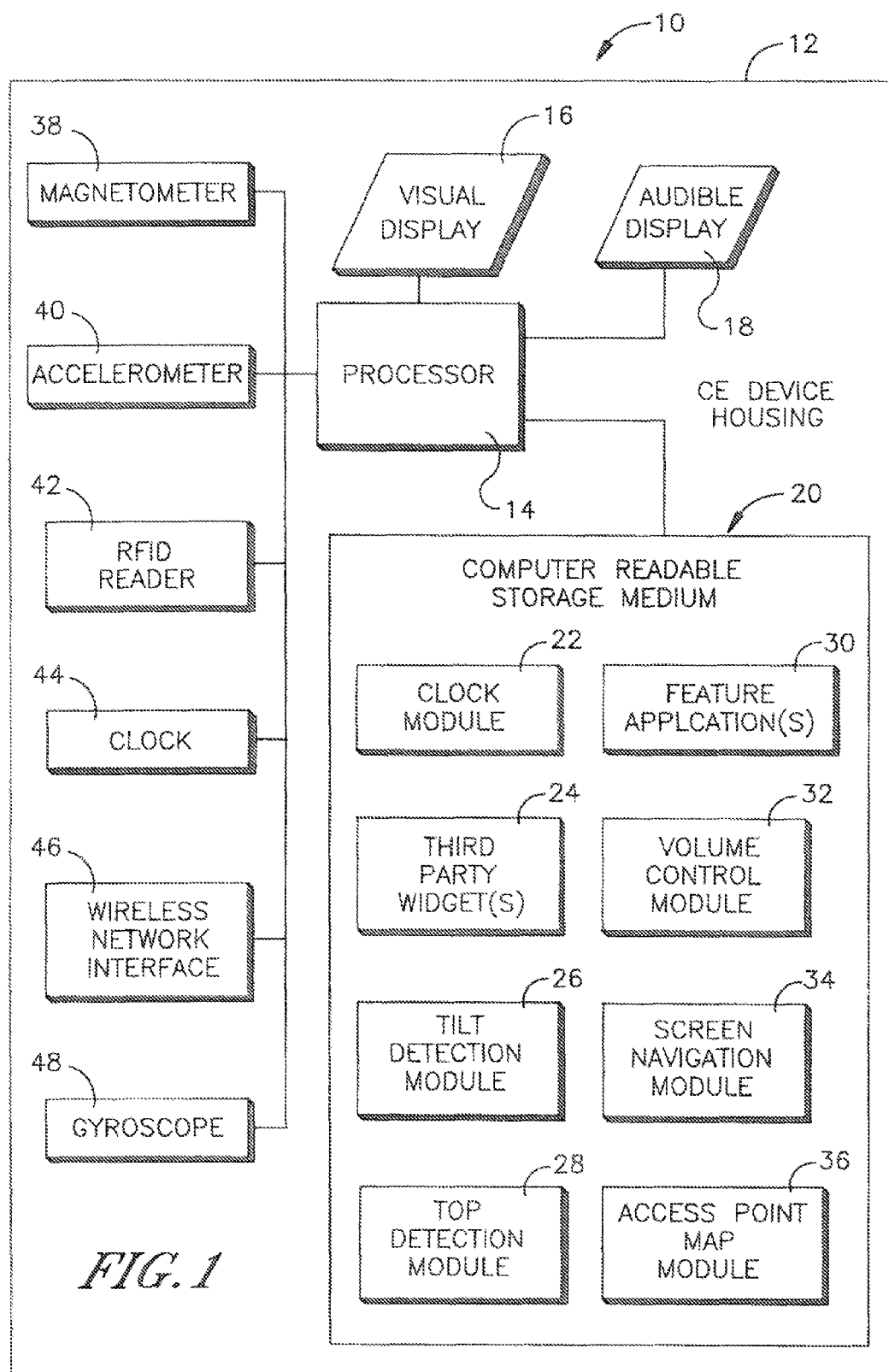
FIG. 1 is a block diagram of an example system in accordance with present principles.

Referring initially to FIG. 1, a CE device 10 is shown that includes a typically portable lightweight plastic housing 12 bearing a digital processor 14. The processor 14 can control a visual display 16 and an audible display 18 such as one or more speakers. The visual display 16 may be, e.g., a capacitive touchscreen display, although other display types may be used.

To undertake present principles, the processor 14 may access one or more computer readable storage media 20 such as but not limited to disk-based or solid state storage. In example non-limiting embodiments, the media 20 may store various software modules, including, for example, a clock module 22 for presenting a visual indication of time on the display 16, and one or more widgets 24 that may be provided by third parties and/or by the manufacturer of the CE device. By "widget" is meant a portable module of computer software that can be installed and executed within, for example, a HTML-based web page by an end user without requiring compilation. Widgets can take the form of on-screen tools (such as, e.g., clocks, event countdowns, auction-tickers, stock market tickers, flight arrival information, daily weather etc).

Additionally, the media 20 may store a tilt detection module 26 and a tap detection module 28. The tilt detection module 26 can be executed by the processor 14 to translate acceleration signals from the below-described accelerometer into an indication of tilting the CE device 10 about one or more spatial axes. Because the acceleration signals represent acceleration in each of the three dimensions of space, such translation to tilt is straightforward, essentially representing the combination of three acceleration vectors.

In contrast, the tap module 28 may be executed by the processor 14 to determine that a person has tapped the housing 12 by observing a spike (sudden increase followed by sudden decrease) in acceleration in at least one of the three dimensions.

The media 20 may also include one or more feature application(s) 30 such as an e-book application, a recipe application, a notes application in which, for instance, a user can input handwriting by moving a stylus over the display 16 which is then translated by image recognition software into alpha-numeric character code for storage, and a music/video player application, a grocery list application in which, for instance, a user can input grocery items by moving a stylus over the display 16 which is then translated by image recognition software into alpha-numeric character code for storage.

Additionally, the media 20 may bear a volume control module 32 and a screen navigation module 34. A wireless access point (AP) map module 36 may also be stored on the media 20.

The left portion of FIG. 1 shows that in addition to the processor 14, displays 16, 18, and media 20, the housing 12 may hold a magnetometer 38 which outputs a signal to the processor 14 representing magnetic north. Also, an accelerometer assembly 40 communicates acceleration signals to the processor 14 for purposes to be shortly disclosed. In one example, the accelerometer 40 is a MEMS-based accelerometer which outputs signals representing acceleration in each of the three spatial dimensions.

In some examples, a radio frequency identification (RFID) receiver 42 may input signals to the processor 14 indicating IDs read from RFID tags external to the housing 12. A computer clock 44 may also be provided to output a time of day signal to the processor 14 for display of the time on the visual display 16 and for, e.g., the sounding of a time-based alarm on the audible display 18. If desired, a wireless network interface 46 may be in the housing 12 and may communicate with the processor 14 to permit the processor 14 to communicate with a wide area computer network such as the Internet. The interface 46 may be, without limitation, a Wi-Fi interface. If desired, a gyroscope 48 may be provided in the housing 12 and may communicate signals to the processor 14 representative of the azimuthal and/or elevational heading in which the housing 12 is oriented. The device may also incorporate a camera as an optional device. Video or still images can be recorded from the camera as the mapping below is executed and the images then presented in conjunction with the map to establish a "virtual tour" type of application.

Figure 2:
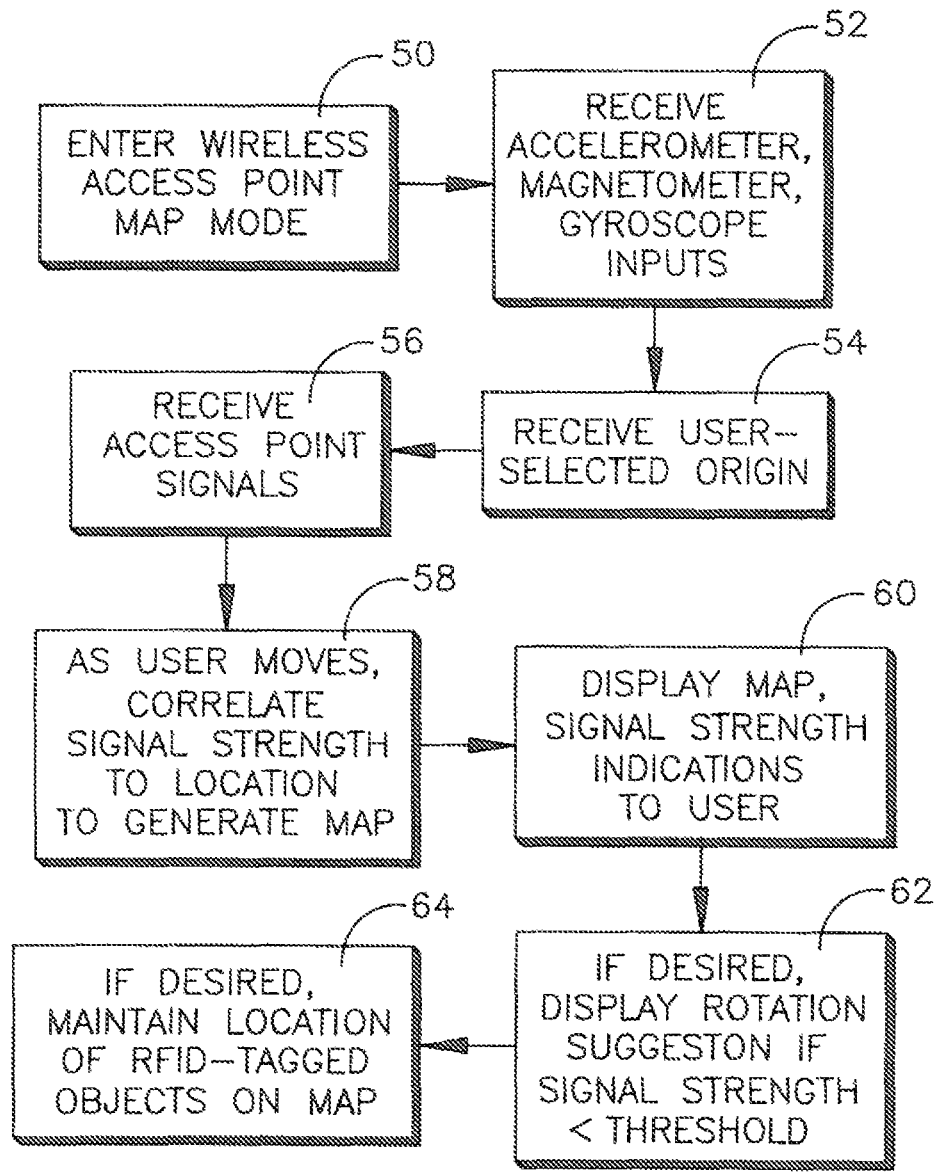
FIG. 2 is a flow chart of example logic for mapping wireless access point (AP) signal strengths.

FIG. 2 shows example logic in accordance with present principles. Commencing at block 50, a map mode may be entered to map wireless access point (AP) reception in a dwelling and/or to map locations of RFID-equipped devices by causing the processor 14 to execute the map module 36. At block 52, the processor receives signals from the accelerometer 40, magnetometer 38, and gyroscope 48, although in some embodiments, owing to overlap of information output by these sensors, the accelerometer and only one of the two remaining devices (gyroscope, magnetometer) may be used.

Proceeding to block 54, the processor 14 receives a user signal indicating that the CE device 10 is positioned at a user-desired origin. For example, the user may input an "origin" signal when the user is standing next to a wireless AP in the dwelling, or next to a relatively fixed RFID-equipped component such as a TV having a RFID tag thereon that can be read by the RFID reader 42 of the CE device 10. The "origin" signal may be input, without limitation, by a predetermined tap pattern when in the map mode that the user is instructed to use to indicate "origin", with the tap or taps being sensed by the accelerometer 40. When the "origin" signal is received, the position including the initial elevation and orientation of the CE device 10 (discussed further below) are recorded.

Moving to block 56, access point signals are received by the network interface 46 of the CE device 10 and as the user moves around the dwelling at block 58, indicia of AP communication conditions such as signal strength (SS) or signal-to-noise ratio (SNR) or bit error rate (BER) or other parameter or parameters are recorded and correlated to the position relative to the origin as indicated by the above-described sensors at which the signals are received. Because a gyroscope and/or magnetometer are used in combination with the accelerometer, the positions may include both linear positions relative to the origin (using the accelerometer signals) as well as orientation direction of the CE device 10 relative to the origin (using the magnetometer and/or gyroscope signals). Elevation of the CE device based on the Y-axis acceleration as sensed by the accelerometer may also be part of the positions. In this way, a map is generated that correlates various positions from the origin to respective AP communication conditions, e.g., to SS.

At block 60, the map generated at block 58 may be presented on the display 16 of the CE device 10 with communication conditions indicated at various locations on the map. Proceeding to block 62, if, for instance, the processor 14 determines that current SS is less than the recorded SS for the current location, the processor 14 may present a message on the visual display 16 or a beep or other audible message on the audio display 18 to suggest to the user rotating the CE device 10 to a new orientation, raising or lowering the CE device 10, etc. until actual received SS approximates the SS mapped to that location at block 58.

In addition to or in lieu of mapping AP communication conditions, the above process can be used to map locations of various RFID-equipped components in the home relative to the CE device 10 at block 64. For example, if RFID tags are appended to components in the home, the RFID tags can be read as the user moves about at block 58 and their locations added to the map, so that a user of the CE device 10 subsequently can invoke the map to review the last-mapped positions of the various tagged devices, such as car keys, within the home.

FIG. 3 illustrates a map 66 that may be presented on the visual display 16 in accordance with above principles. The map 66 may include wall and door boundaries 68 derived from a computer-stored floor plan of the user's home that is downloaded via, e.g., the network interface 44 and stored on the media 20, although in some embodiments no boundaries 68 need be presented.

In FIG. 3, "PID (1)" represents the CE device 10, and a track 70 representing the user's movement at block 58 in FIG. 2 may be presented on the map. The map can present an image or icon 72 of the wireless AP at the position indicated by the user to be the origin of the map. Indications of AP SS can be presented on the track 70 as recorded at block 58 for various locations on the track. The indications may be color coded (e.g., green for "good", orange for "marginal", red for "poor") or, as shown at 74, 76, and 78 in FIG. 3, may be textual, e.g., "good" "strong", and "dead zone", respectively.

Furthermore, RFID-tagged devices can be depicted on the map at their locations in the home, as shown at circled letters (A)-(D) in FIG. 3.

With the above in mind, it may now be appreciated that present principles provide a CE device with an intuitive user interface in which fundamentally natural human gestures can be correlated to intuitive input signals.

FIG. 4 shows alternative logic for determining where RFID-tagged devices, such as, for example, keys that can be mislaid, are located. The mobile device processor can execute the appropriate blocks in FIG. 4.

Commencing at block 100, a device as described above can have an RFID communication device that can send a query ping or pulse or that simply receives signals from RFID-tagged devices. An RFID-tagged target object can send a signal or, when the RFID communication device of the mobile device is also a transmitter sending query pulses, the RFID-tagged object return response to the pulse at block 102, and the time of receipt of the response (or time of transmission of the ping or pulse) is recorded. The location of the mobile device at the recorded time is recorded.

A person carrying the mobile device can move at block 104 and then at block 106 the accelerometer and/or magnetometer are used to determine a new location from the location at which the ping or pulse was sent at block 100 using, e.g., speed/acceleration information gleaned from the accelerometer and/or direction information gleaned from the magnetometer.

At block 108 a second ping or pulse is transmitted from the mobile device. These steps can be repeated more than twice if desired, i.e., the logic can loop multiple times to obtain multiple returns from the RFID-tagged device.

At any rate, the additional responses are received as indicated at block 110 with their times recorded and the signal strengths of the responses are correlated to distances at block 112. This correlation may be undertaken using an empirically determined signal strength-to-distance lookup table, for example.

Proceeding to block 114, the times of the pings/responses are correlated to respective locations of the mobile device while each distance is associated with its respective mobile device location. Using the distances and mobile device locations, the location of the target device can be determined. For example, distance vectors having lengths corresponding to the distance magnitudes can be calculated at block 116 with the origin of each vector positioned on the corresponding mobile device location. At block 118 the orientation of the vectors can be changed until the endpoints of the vectors meet, with the location of the endpoints when they meet each other being output at block 120 as the location of the target device.

While the particular ACCELEROMETER-BASED CE DEVICE WIRELESS ACCESS POINT MAPPING is herein shown and described in detail, it is to be understood that the subject matter which is encompassed by the present invention is limited only by the claims.

What is claimed is:

1. Consumer electronics (CE) device comprising:
   housing bearing a processor and a visual display, the processor controlling the display;
   accelerometer in the housing and outputting signals to the processor representing acceleration of the housing;
   the processor using the signals from the accelerometer to generate a map of wireless access point (AP) communication conditions relative to an origin location in a building.

2. The CE device of claim 1, wherein the processor causes the map to be presented on the visual display.

3. The CE device of claim 1, wherein the map correlates locations in the building with respective AP communication conditions.

4. The CE device of claim 3, wherein the positions include linear position relative to the origin and orientation.

5. The CE device of claim 1, further comprising a magnetometer and/or gyroscope communicating with the processor, the processor using signals from the magnetometer and/or gyroscope to generate the map.

6. The CE device of claim 1, wherein the processor indicates on the map locations of radiofrequency identification (RFID) tag-equipped components in the building.

7. The CE device of claim 1, wherein the communication condition includes signal strength (SS).

8. The CE device of claim 7, wherein the processor determines that current SS is less than a recorded SS for a current location, and in response presents a message on the CE device to move the CE device to a new location.

9. Consumer electronics (CE) device comprising:
   housing bearing a processor and a visual display, the processor controlling the display;
   accelerometer in the housing and outputting signals to the processor representing acceleration of the housing;
   the processor using the signals from the accelerometer to generate a map of locations of radiofrequency identification (RFID) tag-equipped components in a building.

10. The CE device of claim 9, wherein the processor causes the map to be presented on the visual display.

11. The CE device of claim 10, wherein the processor correlates wireless access point (AP) communication conditions relative to an origin location in a building, the map presenting locations in the building with respective AP communication conditions.

12. The CE device of claim 11, wherein the positions include linear position relative to the origin and orientation.

13. The CE device of claim 11, further comprising a magnetometer and/or gyroscope communicating with the processor, the processor using signals from the magnetometer and/or gyroscope to generate the map.

14. The CE device of claim 11, wherein the communication conditions include signal strength (SS).

15. The CE device of claim 14, wherein the processor determines that current SS is less than a recorded SS for a current location, and in response presents a message on the CE device to move the CE device to a new location.

16. Consumer electronics (CE) device comprising:
housing bearing a processor;
motion sensor in the housing and outputting signals to the processor; and
a radiofrequency identification (RFID) communication device in the housing and communicating with the processor, the processor causing the RFID communication device to transmit at least first and second pulses to a target, the RFID communication device receiving back first and second responses from the target in response to the respective first and second pulses, each response having a signal strength and the first and second pulses and/or first and second responses being associated with respective first and second times, the signals strengths being correlated to respective first and second distances, the first and second times being correlated to respective first and second locations of the CE device, the processor determining a location of the target based on the first and second distances and first and second locations.

17. Consumer electronics (CE) device comprising:
housing bearing a processor;
motion sensor in the housing and outputting signals to the processor; and
a radiofrequency identification (RFID) communication device in the housing and communicating with the processor, the RFID communication device receiving first and second RFID signals from the target, each signal having a signal strength and the first and second signals being associated with respective first and second times, the signals strengths being correlated to respective first and second distances, the first and second times being correlated to respective first and second locations of the CE device, the processor determining a location of the target based on the first and second distances and first and second locations.

* * * * *